(12) United States Patent (10) Patent No.: US 11,479,016 B2
Sieradzki et al. (45) Date of Patent: Oct. 25, 2022

(54) COEXTRUDED CROSSLINKED POLYOLEFIN FOAM WITH POLYAMIDE CAP LAYERS

(71) Applicant: Toray Plastics (America), Inc., North Kingstown, RI (US)

(72) Inventors: Pawel Sieradzki, Winchester, VA (US); Jesse Jude Baldwin, Strasburg, VA (US); Dan Ben-Daat, Winchester, VA (US); Kaitlyn Michelle Bock, Winchester, VA (US)

(73) Assignee: Toray Plastics (America), Inc., North Kingstown, RI (US)

( * ) Notice: Subject to any disclaimer, the term of this patent is extended or adjusted under 35 U.S.C. 154(b) by 176 days.

(21) Appl. No.: 16/836,229

(22) Filed: Mar. 31, 2020

(65) Prior Publication Data

US 2021/0299994 A1 Sep. 30, 2021

(51) Int. Cl.
*B32B 5/18* (2006.01)
*B32B 5/32* (2006.01)
(Continued)

(52) U.S. Cl.
CPC ............ *B32B 5/18* (2013.01); *B29C 48/07* (2019.02); *B29C 48/21* (2019.02); *B32B 5/32* (2013.01);
(Continued)

(58) Field of Classification Search
CPC ........... B32B 5/18; B32B 5/32; B32B 27/065; B32B 27/32; B32B 27/34; B32B 5/20; B32B 5/245; B32B 27/327; B32B 2266/025; B32B 2323/04; B32B 2323/043; B32B 2323/046; B32B 2323/10; B32B 2377/00; Y10T 428/24967; C08J 2423/04; C08J 2423/06; C08J 2423/08;
(Continued)

(56) References Cited

U.S. PATENT DOCUMENTS

| 2006/0216535 A1 | 9/2006 | Günter et al. |
| 2018/0281358 A1* | 10/2018 | Ben-Daat ............... B32B 5/145 |
| 2021/0299995 A1 | 9/2021 | Sieradzki et al. |

FOREIGN PATENT DOCUMENTS

| EP | 2258545 A1 * | 12/2010 | ............ B32B 15/08 |
| EP | 2258545 A1 | 12/2010 | |

(Continued)

OTHER PUBLICATIONS

Schuhmann (EP 2258545 A1); Dec. 2010 (EPO—machine translation). (Year: 2010).*

(Continued)

*Primary Examiner* — Frank J Vineis
*Assistant Examiner* — Donald M Flores, Jr.
(74) *Attorney, Agent, or Firm* — Morrison & Foerster LLP

(57) ABSTRACT

Described herein are physically crosslinked, closed cell continuous multilayer foam structures that includes a foam layer comprising polypropylene, polyethylene, or a combination of polypropylene and polyethylene and a polyamide cap layer. The multilayer foam structure can be obtained by coextruding a multilayer structure comprising at least one foam composition layer and at least one cap composition layer, irradiating the coextruded structure with ionizing radiation, and continuously foaming the irradiated structure.

28 Claims, 8 Drawing Sheets

Example 1B

(51) Int. Cl.
    *B32B 27/32* (2006.01)
    *B32B 27/34* (2006.01)
    *B29C 48/21* (2019.01)
    *B29C 48/07* (2019.01)
    *B32B 27/06* (2006.01)
    *B29K 105/00* (2006.01)
    *B29K 77/00* (2006.01)
    *B29K 105/04* (2006.01)
    *B29K 23/00* (2006.01)

(52) U.S. Cl.
    CPC ............ *B32B 27/065* (2013.01); *B32B 27/32* (2013.01); *B32B 27/34* (2013.01); *B29K 2023/06* (2013.01); *B29K 2023/12* (2013.01); *B29K 2077/00* (2013.01); *B29K 2105/0094* (2013.01); *B29K 2105/046* (2013.01); *Y10T 428/24967* (2015.01)

(58) Field of Classification Search
    CPC ................ C08J 2423/10; C08J 2423/12; C08J 2423/14; C08J 2423/16; C08J 2323/04; C08J 2323/06; C08J 2323/08; C08J 2323/10; C08J 2323/12; C08J 2323/14; C08J 2323/16; B29K 2105/04; B29K 2105/041; B29K 2105/043; B29K 2105/045; B29K 2105/046

See application file for complete search history.

(56) References Cited

FOREIGN PATENT DOCUMENTS

| | | | |
|---|---|---|---|
| EP | 3385073 | A1 | 10/2018 |
| EP | 3406441 | A1 | 11/2018 |
| JP | 03086728 | A * | 4/1991 ............. B29C 65/00 |

OTHER PUBLICATIONS

Hamada (JP H03-086728 A); Apr. 1991 (EPO—machine translation). (Year: 1991).*

International Search Report and Written Opinion dated Jun. 25, 2021, directed to International Application No. PCT/US2021/024485; 14 pages.

International Search Report and Written Opinion dated Jun. 25, 2021, directed to International Application No. PCT/US2021/024476; 14 pages.

* cited by examiner

COEXTRUDED CROSSLINKED POLYOLEFIN FOAM WITH POLYAMIDE CAP LAYERS

FIELD OF THE DISCLOSURE

This invention relates to multilayer polyolefin foam/polyamide cap structures and a method for making these structures. More particularly, to a method of making coextruded, crosslinked polyolefin multilayer foam/polyamide cap structures.

BACKGROUND OF THE DISCLOSURE

Crosslinked polyolefin foam can be used in various commercial applications including, but not limited to, a trim component in a vehicle interior such as a door panel. To prepare a polyolefin foam to be used on a vehicle door panel, the foam layer is typically first laminated to a film, fabric, or foil to create a bilaminate. This flexible bilaminate then needs to be combined with a hard substrate to make the panel.

Various production methods are employed within the automotive industry to combine the flexible bilaminate with the panel. These methods include thermoforming techniques such as negative vacuum forming (NVF) and positive vacuum forming (PVF), compression molding, and low pressure molding (LPM), among others.

In low pressure molding, the bilaminate is placed into a mold with the film, fabric, or foil facing the "A" surface of the mold. The mold is closed and polypropylene is injected into the "B" side of the cavity—filling the mold to form the panel. In commercial production processes it is common for the polypropylene to be a very high melt flow (50-125 grams per 10 minutes at 230° C.) impact modified homopolymer or random copolymer injected at about 200° C.

Problems arise with the design and implementation of LPM. The hot polypropylene in and around the injection point can shear away or degrade the foam since the injection temperature can be well above the melting temperature of the foam. In one scenario, an "orange peel" type visual defect can be observed from the "A" surface in and around the injection point. In another scenario, the foam around the injection point can be completely sheared away—leaving a visible depression of the film, fabric, or foil at the injection site.

Manufacturers have implemented various techniques to help reduce these problems. One technique is to inject the polypropylene at the offal portion of the bilaminate. While this is generally effective in solving the foam shear and degradation issues within the mold cavity, it increases the cost to make the panel. Injecting at the offal requires the offal to be longer along at least one side of the mold. The offal along the injection side will then also contain the injected polypropylene. The cost of wasting the additional offal—which includes both the bilaminate and injected polypropylene—can be substantial. Also, the offal is not readily recyclable—further adding to the cost of this additional waste.

Another technique to reduce foam shear and degradation defects in LPM is by using a flexible trilaminate. A trilaminate can be the same as an LPM bilaminate with a flexible homopolymer based TPO or TPE layer laminated to the "B" side of the bilaminate. The TPO or TPE layer acts as a protective skin layer and/or a sacrificial skin layer between the foam and the polypropylene being injected.

However, problems also occur with trilaminate use in LPM. The TPO or TPE layer thickness can be substantial in relation to the overall bilaminate thickness which increases material costs. To produce the trilaminate, a $2^{nd}$ lamination step is required which further increases the cost of the trilaminate. Finally, the protective TPO or TPE layer is also prone to shear and degradation at the injection site. Vehicle door panel manufacturers using an LPM technology commonly continue to inject the polypropylene at the offal portion of the trilaminate. While the quantity of offal required for this setup is less than using a bilaminate, it still requires more offal than would be needed if injecting directly into the mold cavity. The cost of wasting the additional offal—which includes both the trilaminate of and injected polypropylene—is substantial. Difficulty with recycling the offal adds further cost to this manufacturing technique

SUMMARY OF THE DISCLOSURE

It has been discovered that it is possible to produce a physically crosslinked, closed cell polyolefin foam with at least one polyamide cap layer in a continuous process. The multilayered structure can be laminated to a film, fabric, or foil to create a bilaminate. The bilaminate can then be used in LPM applications and overcome the problems associated with traditional LPM bilaminates and trilaminates used to produce vehicle interior trim components.

In some embodiments, the polyamide layer can act as a more effective protective layer (versus a TPO or TPE layer) to the polypropylene being injected. Common commercial polyamides vary widely in their melting temperature but most exhibit a melting temperature above homopolymer polypropylene. Thus, a polyamide can be selected that is not only above the melting temperature of the polypropylene being injected, but also above the injection temperature. The high melt temperature of the polyamide can ensure that the polyamide remains intact, providing a barrier that does not melt or sheer when in contact with the injected polypropylene—even at the injection point. Furthermore, injecting in the offal region can become unnecessary, further reducing the cost of offal waste. The polyamide cap layer can be substantially thinner than a TPO or TPE layer when appropriately chosen for the LPM process by being a non-sacrificial layer, thereby further reducing material costs.

Polypropylene grafted with maleic anhydride can be a suitable compatibilizer between polyolefin and polyamide. Maleic anhydride grafted impact modified polypropylene homopolymers and maleic anhydride grafter polypropylene random copolymers are commercially abundant. This can allow for a direct replacement of the injected impact modified homopolymer or random copolymer with minimal adjustments in a traditional LPM manufacturing process.

In some embodiments, a multilayer foam structure is provided, the multilayer foam structure comprising a foam layer including polypropylene, polyethylene, or a combination of polypropylene and polyethylene; and a cap layer on a side of the foam layer, the cap layer including polyamide; and polypropylene, polyethylene, or a combination of polypropylene and polyethylene. In some embodiments, the foam layer and the cap layer may be coextruded. In some embodiments, the foam layer can comprise at least 70 wt. % polypropylene, polyethylene, or a combination of polypropylene and polyethylene. In some embodiments, the cap layer may comprise at least 40 wt. % polyamide. In some embodiments, the cap layer may comprise at most 50 wt. % polypropylene, polyethylene, or a combination of polypropylene and polyethylene; and at least 40 wt. % polyamide. In some embodiments, a thickness of the cap layer may be less than 1 mm. In some embodiments, the foam layer can comprise a crosslinking promoter in an amount of 0.5-5 wt. %. In some embodiments, the foam layer may comprise additives in an amount of 1-20 wt. %. In some embodiments, the cap layer may comprise additives in an amount of 1-10 wt. %. In some embodiments, the polypropylene may have a melt flow index of 0.1-25 grams per 10 minutes at 230° C. In some embodiments, the polyethylene may have a melt flow index of 0.1-25 grams per 10 minutes at 190° C. In some embodiments, the density of the multilayer foam structure may be 20-250 kg/m$^3$. In some embodiments, the multilayer foam structure may have a crosslinking degree of 20-75%. In some embodiments, the multilayer foam structure may have an average closed cell size of 0.05-1.0 mm. In some embodiments, the multilayer foam structure may have a thickness of 0.2-50 mm.

In some embodiments, a laminate is provided, the laminate comprising a multilayer foam structure including a foam layer including polypropylene, polyethylene, or a combination of polypropylene and polyethylene, and a cap layer on a side of the foam layer, the cap layer including polyamide; and polypropylene, polyethylene, or a combination of polypropylene and polyethylene; and a laminate layer on a side of the foam layer opposite the cap layer. In some embodiments, the foam layer and the cap layer may be coextruded. In some embodiments, the laminate layer may be a flexible film, fabric, or foil.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

It is understood that aspects and embodiments described herein include "consisting" and/or "consisting essentially of" aspects and embodiments. For all methods, systems, compositions, and devices described herein, the methods, systems, compositions, and devices can either comprise the listed components or steps, or can "consist of" or "consist essentially of" the listed components or steps. When a system, composition, or device is described as "consisting essentially of" the listed components, the system, composition, or device contains the components listed, and may contain other components which do not substantially affect the performance of the system, composition, or device, but either do not contain any other components which substantially affect the performance of the system, composition, or device other than those components expressly listed; or do not contain a sufficient concentration or amount of the extra components to substantially affect the performance of the system, composition, or device. When a method is described as "consisting essentially of" the listed steps, the method contains the steps listed, and may contain other steps that do not substantially affect the outcome of the method, but the method does not contain any other steps which substantially affect the outcome of the method other than those steps expressly listed.

In the disclosure, "substantially free of" a specific component, a specific composition, a specific compound, or a specific ingredient in various embodiments, is meant that less than about 5%, less than about 2%, less than about 1%, less than about 0.5%, less than about 0.1%, less than about 0.05%, less than about 0.025%, or less than about 0.01% of the specific component, the specific composition, the specific compound, or the specific ingredient is present by weight. Preferably, "substantially free of" a specific component, a specific composition, a specific compound, or a specific ingredient indicates that less than about 1% of the specific component, the specific composition, the specific compound, or the specific ingredient is present by weight.

Additional advantages will be readily apparent to those skilled in the art from the following detailed description. The examples and descriptions herein are to be regarded as illustrative in nature and not restrictive.

BRIEF DESCRIPTION OF THE FIGURES

Various embodiments are described, by way of example only, with reference to the accompanying drawings, in which.

DETAILED DESCRIPTION OF EXEMPLARY EMBODIMENTS

Figure 1:
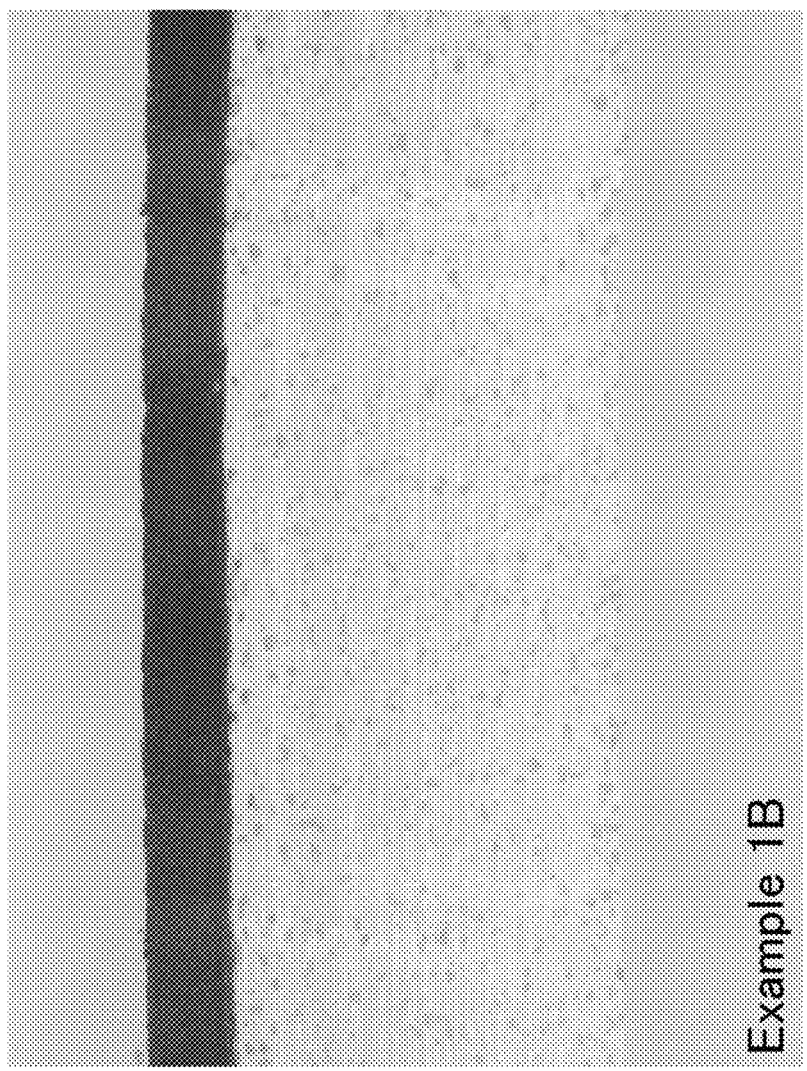
FIG. 1 is a cross-sectional image of a microtome slice of Example 1B unfoamed at 100× magnification.

Described are methods of producing crosslinked, closed cell coextruded multilayer foam structures comprising at least a foam layer including polypropylene, polyethylene, or combinations thereof and at least a cap layer including polyamide. The methods for producing a crosslinked, closed cell coextruded multilayer foam structure layer may include the steps of (a) co-extrusion, (b) irradiation, and (c) foaming.

Co-extrusion is the extrusion of multiple layers of material simultaneously. This type of extrusion utilizes two or more extruders to deliver a steady volumetric throughput of material to an extrusion head (die) which can extrude the materials in the desired form.

In the co-extrusion step, foam compositions can be fed into multiple extruders to form an unfoamed, multilayer structure. For example, an "A" foam composition can be fed into one extruder and a "B" foam composition can be fed into a second extruder. The method of feeding ingredients into the extruders can be based on the design of the extruder and the material handling equipment available. Preblending ingredients of the foam compositions may be performed, if necessary, to facilitate their dispersal. A Henshel mixer can be used for such preblending. All ingredients can be preblended and fed thru a single port in the extruder. The ingredients can also be individually fed thru separate designated ports for each ingredient. For example, if the cross-linking promoter or any other additive is a liquid, the promoter and/or additives can be added through a feeding gate (or gates) on the extruder or through a vent opening on the extruder (if equipped with a vent) instead of being preblended with solid ingredients. Combinations of pre-blending and individual ingredient port feeding can also be employed.

Each extruder can deliver a steady amount of each composition into one or more manifolds followed by a sheeting die to create an unfoamed co-extruded multilayer sheet. There are two common methods for co-extruding materials: (1) feed block manifolds; and (2) multi-manifolds within the die. Elements of a feed block manifold can include: (a) inlet ports for the upper, middle, and lower layers; (b) a stream-lined melt lamination area that channels separate flow streams into one laminated melt stream inside the feed block; (c) an adapter plate between the feed block and the sheet die; and/or (d) a sheet die (similar to monolayer die), wherein the laminated melt stream enters the center of the die and spreads out along the manifold flowing out of the die exit as a distinct multilayer extrudate. Elements of a multi-manifold die can be: (a) similar to a monolayer die, except that there is more than one feed channel; (b) that each melt channel has its own choker bar for flow control; and/or (c) that the melt streams converge inside the die near the exit and emerge as a distinct multilayer extrudate.

Layer thicknesses can be determined by the design of the manifold(s) and die. For example, an 80/20 feed block manifold can deliver compositions in approximately a 4:1 ratio when the speed and size of each extruder is matched accordingly. This ratio can be altered by changing, for example: (a) the relative extrusion speed between one extruder and another; (b) the relative size of each extruder; and/or (c) the composition (i.e., the viscosity) of the individual layers.

The thickness of the overall multilayer sheet can be controlled by the overall die gap. However, the overall multilayer sheet thickness can further be adjusted, for example, by stretching (i.e., "drawing") the melted multi-layer extrudate and/or flattening the melted multilayer extrudate through a nip.

The multilayer structures can include at least two layers made up of different compositions. In some embodiments, the multilayer structures include at least one layer made up of a foam composition and at least one layer made up of a non-foam cap composition. In some embodiments, the structure can be a B/A layered structure, B/A/B layered structure, B/A/C layered structure, or can have multiple other layers. In some embodiments, the multilayer structures can include additional layers such as tie layers, film layers, and/or additional foam layers among others.

A cap composition fed into the extruder can include at least one polyamide and a polypropylene, polyethylene, or a combination thereof. A foam composition fed into the extruder can include a polypropylene, polyethylene, or a combination thereof.

Polyamides are polymers that contain an amide group (—CONH—) as a recurring part of the chain. Polyamide includes, but is not limited to, aliphatic polyamide produced by either a condensation reaction of two bifunctional monomers or by ring-opening addition polymerization of cyclic chemical compounds. The polyamide can be a homopolymer, copolymer, terpolymer, or a blend. Importantly, a semi-crystalline polyamide or polyamide blend is preferred over an amorphous polyamide or polyamide blend. Commercially available aliphatic polyamide homopolymer includes, but is not limited to, type 6, 11, 12, 46, 410, 56, 510, 511, 512, 513, 514, 66, 69, 610, 612, 613 1010, 1012, and 1212. Commercially available aliphatic polyamide copolymer includes, but is not limited to, type 6/66, 6/69, 610/66 and 56/12. Commercially available aliphatic polyamide terpolymer includes, but is not limited to, type 6/66/12.

Polypropylene includes, but is not limited to, polypropylene, impact modified polypropylene, polypropylene-ethylene copolymer, impact modified polypropylene-ethylene copolymer, metallocene polypropylene, metallocene polypropylene-ethylene copolymer, metallocene polypropylene olefin block copolymer (with a controlled block sequence), polypropylene based polyolefin plastomer, polypropylene based polyolefin elasto-plastomer, polypropylene based polyolefin elastomer, polypropylene based thermoplastic polyolefin, and polypropylene based thermoplastic elastomeric blend. The polypropylene can be a high melt strength type. Furthermore, the polypropylenes may be grafted with maleic anhydride.

Polyethylene includes, but is not limited to, LDPE, LLDPE (homopolymer, copolymer with butene or hexane or octene, terpolymer with butene and/or hexene and/or octene), VLDPE homopolymer, copolymer with butene or hexene or octene, terpolymer with butene and/or hexene and/or octene), VLLDPE (homopolymer, copolymer with butene or hexene or octene, terpolymer with butene and/or hexene and/or octane), HDPE, polyethylene-propylene copolymer, metallocene polyethylene, metallocene ethylene-propylene copolymer, and metallocene polyethylene olefin block copolymer (with a controlled block sequence), any of which may contain grafted compatibilizers or copolymers that contain acetate and/or ester groups. These polyethylenes may be grafted with maleic anhydride. These polyethylenes may also be copolymers and terpolymers containing acetate and/or ester groups and may be copolymer and terpolymer ionomers containing acetate and/or ester groups.

A non-foam cap composition fed into the extruder can include at least about 40 wt. % polyamide, preferably at least about 50 wt. % polyamide, more preferably at least about 60 wt. % polyamide, and even more preferably at least about 70 wt. % polyamide.

In some embodiments, the polyamide in the non-foam cap composition fed into the extruder can be greater than or equal to about 40 wt. % polyamide, 50 wt. % polyamide, 60 wt. % polyamide, or 70 wt. % polyamide. In some embodiments, the polyamide in the non-foam cap composition fed into the extruder can be less than or equal to about 95 wt. % polyamide, 90 wt. % polyamide, 85 wt. % polyamide, or 80 wt. % polyamide. In some embodiments, the polyamide in the non-foam cap composition fed into the extruder can be about 40-95 wt. % polyamide, 50-90 wt. % polyamide, 60-85 wt. % polyamide, or 70-80 wt. % polyamide.

In some embodiments, an amount of polyethylene, polypropylene, or combination thereof in the non-foam cap composition fed into the extruder can be greater than or equal to about 5 wt. %, 10 wt. %, or 20 wt. % polyethylene, polypropylene, or combination thereof. In some embodiments, an amount of polyethylene, polypropylene, or combination thereof in the non-foam cap composition fed into the extruder can be less than or equal to about 50 wt. %, 40 wt. %, 35 wt. %, or 30 wt. % polyethylene, polypropylene, or combination thereof. In some embodiments, an amount polyethylene, polypropylene, or combination thereof in the non-foam cap composition fed into the extruder can be 5-50 wt %, 10-40 wt %, or 20-30 wt. % polyethylene, polypropylene, or combination thereof.

A foam composition fed into the extruder can include at least about 75 wt. % polypropylene, polyethylene, or a combination thereof, preferably at least about 80 wt. %, more preferably at least about 85 wt. %, and even more preferably at least about 90 wt. %.

In some embodiments, the foam composition fed into the extruder can be at least about 70 wt. %, 80 wt. %, or 85 wt. %, polypropylene, polyethylene, or a combination thereof. In some embodiments, the foam composition fed into the extruder can be at most about 98 wt. %, 95 wt. %, or 90 wt. % polypropylene, polyethylene, or a combination thereof. In some embodiments, the foam composition fed into the extruder can be about 70-98 wt. %, 80-95 wt. %, or 85-90 wt. % polypropylene, polyethylene, or a combination thereof.

Since a broad range of multilayer structures and foam articles can be created with the disclosed compositions, a broad range of polyamides, polypropylenes, and polyethylenes can be employed in the compositions to meet various in-process manufacturing requirements and commercial end use requirements.

A non-limiting example of "polypropylene" is an isotactic homopolypropylene. Commercially available examples include, but are not limited to, FF018F from Braskem, 3271 from Total Petrochemicals, and COPYLENE™ CH020 from Phillips 66.

A non-limiting example of an "impact modified polypropylene" is a homopolypropylene with ethylene-propylene (EP) copolymer rubber. The rubber can be amorphous or semicrystalline but is not in sufficient quantities to render the material any plastomeric or elastomeric properties. A few non-limiting examples of commercially available "impact modified polypropylene" are TI4003F and TI4015F from Braskem and Pro-fax® 8623 and Pro-fax® SB786 from LyondellBasell.

"Polypropylene-ethylene copolymer" is polypropylene with random ethylene units. A few non-limiting examples of commercially available "polypropylene-ethylene copolymer" are 6232, 7250FL, and Z9421 from Total Petrochemicals, 6D20 and DS6D81 from Braskem, and PRO-FAX® RP311H and ADSYL® 7415XCP from LyondellBasell.

"Impact modified polypropylene-ethylene copolymer" is polypropylene with random ethylene units and with ethylene-propylene (EP) copolymer rubber. The rubber can be amorphous or semicrystalline, but is not in sufficient quantities to render the material any plastomeric or elastoplastomeric properties. A non-limiting example of a commercially available impact modified polypropylene-ethylene copolymer is PRISMA® 6910 from Braskem.

Metallocene polypropylene" is metallocene syndiotactic homopolypropylene, metallocene atactic homopolypropylene, and metallocene isotactic homopolypropylene. Non-limiting examples of "metallocene polypropylene" are those commercially available under the trade names METOCENE® from LyondellBasell and ACHIEVE™ from ExxonMobil. Metallocene polypropylenes are also commercially available from Total Petrochemicals and include, but are not limited to, grades M3551, M3282MZ, M7672, 1251, 1471, 1571, and 1751.

"Metallocene polypropylene-ethylene copolymer" is metallocene syndiotactic, metallocene atactic, and metallocene isotactic polypropylene with random ethylene units. Commercially available examples include, but are not limited to, Lumicene® MR10MX0 and Lumicene® MR60MC2 from Total Petrochemicals, Purell® SM170G from LyondellBasell, and the WINTEC® product line from Japan Polypropylene Corporation.

"Metallocene polypropylene olefin block copolymer" is a polypropylene with alternating crystallizable hard "blocks" and amorphous soft "blocks" that are not randomly distributed—that is, with a controlled block sequence. An example of "metallocene polypropylene olefin block copolymer" includes, but is not limited to, the INTUNE® product line from the Dow Chemical Company.

"Polypropylene based polyolefin plastomer" (POP) and "polypropylene based polyolefin elastoplastomer" are both metallocene and non-metallocene propylene based copolymers with plastomeric and elastoplastomeric properties. Non-limiting examples are those commercially available under the trade name VERSIFY® (metallocene) from the Dow Chemical Company, VISTAMAXX® (metallocene) from ExxonMobil, and KOATTRO™ (non-metallocene) from LyondellBasell (a butene-1 based line of plastomeric polymers—certain grades are butene-1 homopolymer based and others are polypropylene-butene-1 copolymer based materials).

"Polypropylene based polyolefin elastomer" (POE) is both metallocene and non-metallocene propylene based copolymer with elastomeric properties. Non-limiting examples of propylene based polyolefin elastomers are those polymers commercially available under the trade names VERSIFY® (metallocene) from the Dow Chemical Company and VISTAMAXX® (metallocene) from ExxonMobil.

"Polypropylene based thermoplastic polyolefin" (TPO) is polypropylene, polypropylene-ethylene copolymer, metallocene homopolypropylene, and metallocene polypropylene-ethylene copolymer, which have ethylene-propylene copolymer rubber in amounts great enough to give the thermoplastic polyolefin blend (TPO) plastomeric, elastoplastomeric or elastomeric properties. Non-limiting examples of TPO polymers are those polymers commercially available under the trade names THERMORIJN® and ZELAS® from Mitsubishi Chemical Corporation, ADFLEX® and SOFTELL® from LyondellBasell, TELCAR® from Teknor Apex Company, and WELNEX™ from Japan Polypropylene Company. TPO can be produced via multi-stage polymerization (for example, ZELAS®, ADFLEX®, SOFTELL®, and WELNEX®) or by blending (for example, THERMORUN® and TELCAR®).

"Polypropylene based thermoplastic elastomer blend" (TPE) is polypropylene, polypropylene-ethylene copolymer, metallocene homopolypropylene, and metallocene polypropylene-ethylene copolymer, which have diblock or multiblock thermoplastic rubber modifiers (SEBS, SEPS, SEEPS, SEP, SERC, CEBC, HSB and the like) in amounts great enough to give the thermoplastic elastomer blend (TPE) plastomeric, elastoplastomeric, or elastomeric properties. Non-limiting examples of polypropylene based thermoplastic elastomer blend polymers are those polymer blends commercially available under the trade name GLS™ DYNAFLEX® and GLS™ VERSAFLEX® from Polyone Corporation, MONPRENE® from Teknor Apex Company and DURAGRIP® from LyondellBasell.

Any of the above polypropylenes may also be a high melt strength (HMS) type. Polypropylene manufacturers employ various methods to strengthen the polymer in the melt phase. For example, polypropylene exhibiting long chain branching (LCB) can be identified as a high melt strength polypropylene. Non-limiting examples of high melt strength polypropylene are those polymers commercially available under the trade names DAPLOY® from Borealis, AMPPLEO® from Braskem, and WAYMAX® from Japan Polypropylene Corporation.

Any polypropylene, but more commonly TPO and TPE blends, may optionally be oil extended with, for example, mineral oil, PARALUX® process oils from Chevron, etc. to further soften the blend, enhance the haptic property of the blend, or improve the processability of the blend.

"LDPE" and "LLDPE" are low density polyethylene and linear low density polyethylene, respectively. Non-limiting examples of LDPE include at least those provided by Dow (e.g., 640I) and Nova (e.g., Novapol® LF-0219-A). Non-limiting examples of LLDPE include at least those provided by ExxonMobil (e.g., LLP8501.67) and Dow (e.g., DFDA-7059 NT 7). Commercial LLDPE polymers are typically copolymers or terpolymers containing α-olefins of butene and/or hexene and/or octene.

"VLDPE" and "VLLDPE" are very low density polyethylene and very linear density low density polyethylene and typically copolymers or terpolymers containing α-olefins of butene and/or hexene and/or octene. Non-limiting examples of VLDPE and VLLDPE are commercially available under the tradename FLEXOMER® from the Dow Chemical Company and particular grades of STAMYLEX® from Borealis.

"Metallocene polyethylene" is metallocene based polyethylene with properties ranging from non-elastic to elastomeric. Non-limiting examples of metallocene polyethylene are commercially available under the trade name ENGAGE™ from Dow Chemical Company, ENABLE™ and EXCEED™ from ExxonMobil, and QUEO® from Borealis.

"Metallocene polyethylene olefin block copolymer" is a polyethylene with alternating crystallizable hard "blocks" and amorphous soft "blocks" that are not randomly distributed—that is, with a controlled block sequence. An example of "metallocene polyethylene olefin block copolymer" includes, but is not limited to, the INFUSE™ product line from the Dow Chemical Company.

All of the above polyethylenes may be grafted with maleic anhydride. Non-limiting commercially available examples are ADMER® NF539A from Mitsui Chemicals, DuPont™ BYNEL® 4104 from Dow, and OREVAC® 18360 from Arkema. It should be noted that many commercial anhydride-grafted polyethylenes also contain rubber.

These polyethylenes may also be copolymers and terpolymers containing acetate and/or ester groups. The comonomer groups include, but are not limited to, vinyl acetate, methyl acrylate, ethyl acrylate, butyl acrylate, glycidyl methacrylate, and acrylic acid. Non-limiting examples are commercially available under the tradename DuPont™ BYNEL®, DuPont™ ELVAX® and DuPont™ ELVALOY® from Dow; EVATANE®, LOTADER®, and LOTRYL® from Arkema; ESCORENE®, ESCOR®, and OPTEMA® from ExxonMobil.

The polypropylenes and polyethylenes listed above can be functionalized. Functionalized polypropylenes and polyethylenes include a grafted monomer. Typically, the monomer has been grafted to the polypropylene or polyethylene by a free radical reaction. Suitable monomers for preparing functionalized polypropylenes and polyethylenes are, for example, olefinically unsaturated monocarboxylic acids, e.g. acrylic acid or methacrylic acid, and the corresponding tert-butyl esters, e.g. tert-butyl (meth) acrylate, olefinically unsaturated dicarboxylic acids, e.g. fumaric acid, maleic acid, and itaconic acid and the corresponding mono- and/or di-tert-butyl esters, e.g. mono- or di-tert-butyl fumarate and mono- or di-tert-butyl maleate, olefinically unsaturated dicarboxylic anhydrides, e.g. maleic anhydride, sulfo- or sulfonyl-containing olefinically unsaturated monomers, e.g. p-styrenesulfonic acid, 2-(meth)acrylamido-2-methylpropenesulfonic acid or 2-sulfonyl-(meth)acrylate, oxazolinyl-containing olefinically unsaturated monomers, e.g. vinyloxazolines and vinyloxazoline derivatives, and epoxy-containing olefinically unsaturated monomers, e.g. glycidyl (meth)acrylate or allyl glycidyl ether.

The most commonly commercially available functionalized polypropylenes are the ones functionalized with maleic anhydride. Non-limiting examples are the ADMER® QF and QB Series from Mitsui Chemicals, the PLEXAR® 6000 Series from LyondellBasell, the DuPont™ BYNEL® 5000 Series from Dow, and the OREVAC® PP Series from Arkema.

The most commonly commercially available functionalized polyethylenes are also those functionalized with maleic anhydride. Non-limiting examples are the ADMER® NF and SE Series from Mitsui Chemicals, the PLEXAR® 1000, 2000, and 3000 Series from LyondellBasell, the DuPont™ BYNEL® 2100, 3000, 3800, 3900, 4000 Series from Dow, and the OREVAC® PE, T, and some of the LOTADER® Series from Arkema.

The most popular method to compatibilize polyamide with polypropylene and polyethylene in various industries is by the use of maleic anhydride grafted polypropylene or polyethylene. For example, in flexible food packaging, a polyamide film can be adhered to a polypropylene film by applying a tie layer of maleic anhydride grafted polypropylene between the film.

Note that polyethylenes functionalized with other grafted monomers are also commercially available. Non-limiting examples include the DuPont™ BYNEL® 1100, 2200, and 3100 Series from Dow and the LOTADER® AX Series from Arkema.

Note also that polymers other than polypropylene and polyethylene functionalized with maleic anhydride are also commercially available. For example, the ROYALTUF® Series from Addivant are a series of EPDM rubbers functionalized with maleic anhydride. In another example, the KRATON® FG series from Kraton are a series of SEBS polymers functionalized with maleic anhydride.

The cap layer can contain at least one extrusion grade or general purpose grade polyamide. Extrusion and general purpose polyamides may be characterized as being from about high viscosity to about medium viscosity. A high to medium viscosity polyamide can more likely match the melt flow characteristics of the foamable layer—resulting in greater thickness uniformity in each coextruded layer from the center to the edges of the die. Most polyamide types are hygroscopic and the moisture content in a polyamide can affect its melt flow and its resistance to flow at a given shear rate. Due to moisture content affecting the flow characteristics, alternate standards to melt flow rate and melt volume rate are typically applied to polyamides. ISO 307 and ASTM D789 are two such standards employed to quantify the viscosity of polyamides. In ISO 307, polyamides can be dissolved into dilute solutions using certain specified solvents to determine a viscosity number. In ASTM D789, polyamides can be dissolved into concentrated solutions using certain specified solvent to determine a relative viscosity. Corresponding standards ISO 16396-1 and ASTM D6779 provide guidance to commercial polyamide manufacturers for identifying the products under a standard system. These nomenclature systems can assist polyamide manufacturers in identifying grades as appropriate for extrusion (cast film, sheet, etc.), injection molding, blow molding, etc. It is important to note that viscosity numbers and relative viscosity numbers are not published by most polyamide manufacturers. Rather, polyamide resins are typically marketed under general viscosity categories (very low, low, medium (or standard), medium high, high, etc.) and recommended processing applications (general extrusion, injection, compounding, monofilament, melt spinning, industrial yarn, etc.)

The composition of any foamable layer and/or any cap layer provided herein can contain at least one polypropylene having a melt flow index from about 0.1 to about 25 grams per 10 minutes at 230° C. The composition of any foamable layer and/or any cap layer provided herein can also contain at least one polyethylene having a melt flow index from about 0.1 to about 25 grams per 10 minutes at 190° C. In some embodiments, the melt flow index of the polypropylene(s) and/or polyethylene(s) is preferably from about 0.3 to about 20 grams per 10 minutes at 230° C. and at 190° C., respectively, and more preferably from about 0.5 to about 15 grams per 10 minutes at 230° C. and at 190° C., respectively. The "melt flow index" (MFI) value for a polymer is defined and measured according to ASTM D1238 at 230° C. for polypropylenes and polypropylene based materials and at 190° C. for polyethylenes and polyethylene based materials using a 2.16 kg plunger for 10 minutes. The test time may be reduced for relatively high melt flow resins.

The MFI can provide a measure of flow characteristics of a polymer and is an indication of the molecular weight and processability of a polymer material. High MFI values correspond to low viscosities. If the MFI values are too high, extrusion according to the present disclosure cannot be satisfactorily carried out. Problems associated with MFI values that are too high include low pressures during extrusion, problems setting the thickness profile, uneven cooling profile due to low melt viscosity, poor melt strength, and/or machine problems. Conversely, low MFI values correspond to high viscosities. MFI values that are too low can cause high pressures during melt processing, sheet quality and profile problems, and higher extrusion temperatures which cause a risk of foaming agent decomposition and activation.

The above MFI ranges are also important for foaming processes because they can reflect the viscosity of the material, which has an effect on the foaming. Without being bound by any theory, it is believed there are several reasons why particular MFI values are more effective. A lower MFI material may improve some physical properties as the molecular chain length is greater, creating more energy needed for chains to flow when a stress is applied. Also, the longer the molecular chain (MW), the more crystal entities the chain can crystallize, thus providing more strength through intermolecular ties. However, at too low an MFI, the viscosity becomes too high. On the other hand, polymers with higher MFI values have shorter chains. Therefore, in a given volume of a material with higher MFI values, there are more chain ends on a microscopic level relative to polymers having a lower MFI, which can rotate and create free volume due to the space needed for such rotation (e.g., rotation occurring above the Tg, or glass transition temperature of the polymer). This can increase the free volume and enables an easy flow under stress forces.

In addition to the polymers, the compositions fed into the extruders may also contain additives compatible with producing the disclosed multilayered structures. Common additives include, but are not limited to, organic peroxides, antioxidants, lubricants, processing aids, thermal stabilizers, colorants, flame retardants, antistatic agents, nucleating agents, plasticizers, antimicrobials, fungicides, light stabilizers, UV absorbents, anti-blocking agents, fillers, deodorizers, odor adsorbers, anti-fogging agents, volatile organic compound (VOC) adsorbers, semi-volatile organic compound (SVOC) adsorbers, thickeners, cell size stabilizers, metal deactivators, and combinations thereof.

In some embodiments, the amount of additive(s) other than the chemical foaming agent(s) and the crosslinking promoter(s) in a foam layer composition can be less than or equal to about 20 PPR %, about 15 PPR %, about 10 PPR %, or about 8 PPR % of the composition. In some embodiments, the amount of additive(s) other than the chemical foaming agent(s) and the crosslinking promoter(s) in a foam layer composition can be greater than or equal to about 1 PPR %, about 2 PPR %, about 4 PPR %, or about 6 PPR % of the composition. In some embodiments, the amount of additive(s) other than the chemical foaming agent(s) and the crosslinking promoter(s) in a foam layer composition can be about 1-20 PPR %, about 2-15 PPR %, about 4-10 PPR %, or about 6-8 PPR % of the composition. In some embodiments, the amount of additive(s) other than the chemical foaming agent(s) and the crosslinking promoter(s) in a foam layer composition can be about 1-20 wt. %, about 2-15 wt. %, about 3-10 wt. %, about 4-8 wt. %, or about 5-7 wt. % of the foam layer composition.

In some embodiments, the amount of additive(s) in a cap layer composition can be less than or equal to about 20 PPR %, about 15 PPR %, about 10 PPR %, about 7 PPR %, about 5 PPR %, or about 3 PPR % of the composition. In some embodiments, the amount of additive(s) in a cap layer composition can be greater than or equal to about 0.5 PPR %, about 1 PPR %, about 2 PPR %, or about 3 PPR % of the composition. In some embodiments, the amount of additive(s) in a cap layer composition can be about 0.5-20 PPR %, about 1-10 PPR %, or about 2-7 PPR % of the composition. In some embodiments, the amount of additive(s) in a cap layer composition can be about 0.5-20 wt. %, about 1-10 wt. %, or about 2-6 wt. % of the cap layer composition.

Regardless of how ingredients are fed into the extruders, the shearing force and mixing within an extruder can be sufficient to produce a homogenous layer. Co-rotating and counter-rotating twin screw extruders can provide sufficient shearing force and mixing thru the extruder barrel to extrude a layer with uniform properties.

Specific energy is an indicator of how much work is being applied during the extrusion of the ingredients for a layer and how intensive the extrusion process is. Specific energy is defined as the energy applied to a material being processed by the extruder, normalized to a per kilogram basis. The specific energy is quantified in units of kilowatts of applied energy per total material fed in kilograms per hour. Specific energy is calculated according to the formula:

$$\text{Specific Energy} = \frac{KW(\text{applied})}{\text{feedrate}\left(\frac{kg}{hr}\right)}, \text{ where}$$

$$KW(\text{applied}) = $$

$$\frac{KW(\text{motor rating}) * (\% \text{ torque from maximum allowable in decimal form}) * RPM(\text{actual running } RPM) * 0.97(\text{gearbox efficiency})}{\text{Max } RPM \text{ (capability of extruder)}}$$

Specific energy can be used to quantify the amount of shearing and mixing of the ingredients within the extruder. The extruders used to form the multilayer structures disclosed herein can be capable of producing a specific energy of at least about 0.100 kW·hr/kg, preferably at least about 0.125 kW·hr/kg, and more preferably at least about 0.150 kW·hr/kg.

Any foamable layer can contain a chemical foaming agent (CFA). The extrusion temperature for any foamable layer can be 0-10° C. below and preferably more than 10° C. below the thermal decomposition initiation temperature of the chemical foaming agent. If the extrusion temperature exceeds the thermal decomposition temperature of the foaming agent, then the foaming agent will decompose, resulting in undesirable "prefoaming." The extrusion temperature for any cap layer can be 0-10° C. below and preferably more than 10° C. below the thermal decomposition initiation temperature of the chemical foaming agent in any foamable layer adjacent to the cap layer. If the extrusion temperature of the cap layer exceeds the thermal decomposition temperature of the foaming agent in the adjacent layer, then the foaming agent in the adjacent layer can decompose, also resulting in undesirable "prefoaming".

The foam layer composition can include a variety of different chemical foaming agents. Examples of chemical foaming agents include, but are not limited to, azo compounds, hydrazine compounds, carbazides, tetrazoles, nitroso compounds, and carbonates. In addition, a chemical foaming agent may be employed alone or in any combination. In some embodiments, one chemical foaming agent that can be used in some embodiments is azodicarbonamide (ADCA). An example of an ADCA chemical foaming agent is UNIFOAM® TC-18I made by P.T. Lauten Otsuka Chemical. ADCA's thermal decomposition typically occurs at temperatures between about 200 to 240° C. In order to prevent ADCA from thermally decomposing in the extruder, extruding temperature can be maintained at or below 200° C.

The amount of chemical foaming agent in a foam layer composition can be less than or equal to about 30 PPR %, about 20 PPR %, about 15 PPR %, about 10 PPR %, or about 8 PPR % of the composition. In some embodiments, the amount of chemical foaming agent in a foam layer composition can be greater than or equal to about 1 PPR %, about 2 PPR %, about 3 PPR %, about 4 PPR %, or about 5 PPR % of the composition. In some embodiments, the amount of chemical foaming agent in a foam layer composition can be about 1-30 PPR %, about 2-20 PPR %, about 3-15 PPR %, about 4-10 PPR %, or about 5-8 PPR % of the composition. In some embodiments, the amount of chemical foaming agent in a foam layer composition can be about 1-30 wt. %, about 2-20 wt. %, 3-15 wt. %, about 4-10 wt. %, or about 5-7 wt. % of the foam layer composition. The amount of chemical foaming agent can depend on the unfoamed sheet thickness, desired foam thickness, desired foam density, materials being extruded, crosslinking percentage, type of chemical foaming agent (different foaming agents can generate significantly different quantities of gas), among others.

Note that the above listed amounts of chemical foaming agent can be specific to ADCA only. Other foaming agents can produce varying amounts of volumetric gas per mass of CFA and can be considered accordingly. For example, when comparing ADCA to the chemical foaming agent p-toluenesulfonyl semicarbazide (TSS), if a foamable layer contains 40 PPR % ADCA, about 63 PPR % TSS would be required to generate about the same amount gas during the foaming step.

If the difference between the decomposition temperature of the thermally decomposable foaming agent and the melting point of the polymer with the highest melting point is high, then a catalyst for foaming agent decomposition may be used. Exemplary catalysts include, but are not limited to, zinc oxide, magnesium oxide, calcium stearate, glycerin, and urea. The lower temperature limit for extrusion can be that of the polymer with the highest melting point. If the extrusion temperature drops below the melting temperature of the polymer with the highest melting point, then undesirable "unmelts" appear. Upon foaming, the extruded layer that was extruded below this lower temperature limit can exhibit uneven thickness, a non-uniform cell structure, pockets of cell collapse, and other undesirable attributes.

Regardless of whether the foaming agents are physical, chemical, or a combination, typical extrusion foaming generates polymer sheets where both primary surfaces are significantly rougher than equivalent structures produced in the disclosed method. The surface profile of a multilayer (as well as a single layer) foam sheet can be critical in many applications and thus extrusion foamed sheets may not be used for these applications. These applications can require a smooth foam surface to obtain desired properties such as ease of lamination to a film, fabric, fiber layer, and a leather; percentage contact area in the lamination; visual aesthetics; etc. PCT Publication WO 2016109544, which is hereby incorporated in its entirety by reference, includes examples illustrating the difference in surface roughness between extrusion foamed polymer sheets and equivalent foamed polymer sheets produced by the disclosed method.

The rougher surfaces of extrusion foamed articles can be generally caused by larger sized cells (when compared to the foams produced according to the present disclosure). Although the cell size and cell size distribution may not be as critical in most commercial applications, because surface roughness is a function of cell size, foams with larger cells can be less desirable than foams with smaller cells for applications requiring a smooth foam surface.

The thickness of the unfoamed, coextruded multilayer structure can be about 0.1 to about 30 mm, about 0.2 to about 25 mm, about 0.3 to about 20 mm, or about 0.4 to about 15 mm. In some embodiments, any individual cap layer can have a thickness of at least about 0.02 mm, at least about 0.05 mm, at least about 0.1 mm, at least about 0.15 mm, or at least about 0.2 mm. In some embodiments, any individual cap layer can have a thickness of less than or equal to about 1.0 mm, about 0.7 mm, or about 0.4 mm. In some embodiments, any individual cap layer can have a thickness of about 0.01-1.0 mm or 0.02-0.7 mm. In some embodiments, the unfoamed cap thickness is not limited in how thin it can be in relation to the overall unfoamed coextruded multilayered sheet, and may be as thin as about 0.1 µm, or the typical thickness of a very thin tie layer used in multilayered flexible packaging and barrier films.

In some embodiments, a foam layer of the unfoamed, coextruded multilayer structure can have a thickness of about 0.1-5 mm, about 0.5-4 mm, about 1-3 mm, or about 1-2 mm. In some embodiments, a foam layer of the unfoamed, coextruded multilayer structure can have a thickness of less than or equal to about 5 mm, about 3 mm, about 2 mm, about 1.5 mm, about 1 mm, or about 0.5 mm. In some embodiments, a foam layer of the unfoamed, coextruded multilayer structure can have a thickness of greater than or equal to about 0.1 mm, about 0.5 mm, about 1 mm, about 1.5 mm, about 2 mm, or about 3 mm.

In some embodiments, the overall thickness of the unfoamed, coextruded multilayered structure can be measured using a stem style thickness gauge attached above a flat base. The tip of the gauge can be fitted with a 1.6 mm radius hemispherical contact point. The stem lifted and the unfoamed structure placed onto the base. A force of 100-150 gf can applied onto the structure at the contact point during the measurement.

In some embodiments, the thickness of the cap layer of the unfoamed, coextruded multilayered structure can be measured using a microscope. To measure the cap layer thickness, a small sample of the structure can be cut from the continuous sheet and the cross-section of the sample sliced into thin sections with a microtome. A section can be placed under the microscope of viewing. A measurement can be performed with either a digital or traditional microscope. A typical commercial digital microscope can have various software features to facilitate the thickness measurement. A traditional commercial microscope can have a lens with measuring scales to facilitate the thickness measurement.

The cap can be thin and easily pliable when melted so as to not significantly hinder the expansion of the foamable layer(s) during the foaming step. The cap's thickness, flexibility, and melt strength are among many physical properties that can hinder the foaming expansion of the other layer(s). The thickness, flexibility, melt strength, and crosslinking percentage of the foamable layer(s) as well as the ultimate thickness and density of the foamed layers are also factors in whether the cap inhibits the expansion of the foamable layer(s). A general guideline for maximum cap thickness is that it should be no more than about 20%, about 15%, about 10%, or about 5% of the overall coextruded unfoamed sheet. If the cap thickness is greater than about 20% of the overall coextruded unfoamed sheet, problems with the multilayered sheet curling, buckling, and folding onto itself may occur as the multilayered sheet is heated and foamed.

It is important to distinguish between "physical" crosslinking and "chemical" crosslinking. In chemical crosslinking, the crosslinks are generated with crosslinking promoters but without the use of ionizing radiation. Chemical crosslinking typically involves using peroxides, silanes, or vinylsilanes. In peroxide crosslinking processes, the crosslinking typically occurs in the extrusion die. For silane and vinylsilane crosslinking processes, the crosslinking typically occurs post-extrusion in a secondary operation where the crosslinking of the extruded material can be accelerated with heat and moisture. Regardless of the chemical crosslinking method, chemically crosslinked foam sheets typically exhibit primary surfaces that are significantly rougher than equivalent structures produced in the disclosed method. The surface profile of a multilayer (as well as single layer) foam sheet can be critical in many applications and thus chemically crosslinked foam sheets may not be used for these applications. These applications can require a smooth foam surface to obtain desired properties such as ease of lamination to a film, fabric, fiber layer, and a leather; percentage contact area in the lamination; visual aesthetics; etc. PCT Publication WO 2016109544 includes examples illustrating the difference in surface roughness between chemically crosslinked foamed polymer sheets and equivalent foamed polymer sheets produced by the disclosed method.

The rougher surfaces of chemically crosslinked foamed articles can be generally caused by larger sized cells (when compared to the foams produced according to the present disclosure). Although the cell size and size distribution is not critical in most commercial applications because surface roughness is a function of cell size, foams with larger cells can be less desirable than foams with smaller cells for applications requiring a smooth foam surface.

Examples of ionizing radiation include, but are not limited to, alpha, beta (electron), x-ray, gamma, and neutron. Among them, an electron beam having uniform energy can be used to prepare the crosslinked polyolefin foam/crosslinked polyolefin cap structure. Exposure time, frequency of irradiation, and acceleration voltage upon irradiation with an electron beam can vary widely depending on the intended crosslinking degree and the thickness of the multilayered structure. However, the ionizing radiation can generally be in the range of from about 10 to about 500 kGy, about 20 to about 300 kGy, or about 20 to about 200 kGy. If the exposure is too low, then cell stability may not be maintained upon foaming. If the exposure is too high, the moldability of the resulting multilayered foam structure may be poor. Moldability is a desirable property when the multilayered foam sheet is used in thermoforming applications. Also, the unfoamed sheet may be softened by exothermic heat release upon exposure to the electron beam radiation such that the structure can deform when the exposure is too high. In addition, the polymer components may also be degraded from excessive polymer chain scission.

The coextruded unfoamed multilayered sheet may be irradiated up to four separate times, preferably no more than twice, and more preferably only once. If the irradiation frequency is more than about four times, the polymer components may suffer degradation so that upon foaming, for example, uniform cells will not be created in the resulting foam layer(s). When the thickness of the extruded structure is greater than about 4 mm, irradiating each primary surface of the multilayered profile with an ionized radiation can be preferred to make the degree of crosslinking of the primary surface(s) and the inner layer more uniform.

Irradiation with an electron beam provides an advantage in that coextruded sheets having various thicknesses can be effectively crosslinked by controlling the acceleration voltage of the electrons. The acceleration voltage can generally be in the range of from about 200 to about 1500 kV, about 400 to about 1200 kV, or about 600 to about 1000 kV. If the acceleration voltage is less than about 200 kV, then the radiation may not reach the inner portion of the coextruded sheets. As a result, the cells in the inner portion can be coarse and uneven on foaming. Additionally, acceleration voltage that is too low for a given thickness profile can cause arcing, resulting in "pinholes" or "tunnels" in the foamed structure. On the other hand, if the acceleration voltage is greater than about 1500 kV, then the polymers may degrade. In some embodiments, the radiation source may face the B layer of the coextruded, unfoamed multilayer sheet during irradiation. In some embodiments, the radiation source may face the A layer of the coextruded, unfoamed multilayer sheet during irradiation.

Regardless of the type of ionizing radiation selected, crosslinking can be performed so that the composition of the extruded structure may be crosslinked about 20 to about 75% or about 30 to about 60%, as measured by the "Toray Gel Fraction Percentage Method." According to the "Toray Gel Fraction Percentage Method," tetralin solvent is used to dissolve non-crosslinked polyolefin components in a composition. In principle, the non-crosslinked polyolefin material is dissolved in tetralin and the crosslinking degree is expressed as the weight percentage of crosslinked material in the entire composition. The apparatus used to determine the percent of polymer crosslinking includes: 100 mesh (0.0045 inch wire diameter); Type 304 stainless steel bags; numbered wires and clips; a Miyamoto thermostatic oil bath apparatus; an analytical balance; a fume hood; a gas burner; a high temperature oven; an anti-static gun; and three 3.5 liter wide mouth stainless steel containers with lids. Reagents and materials used include tetralin high molecular weight solvent, acetone, and silicone oil. Specifically, an empty wire mesh bag is weighed and the weight recorded. For each sample, 100 milligrams±5 milligrams of the sample is weighed out and transferred to the wire mesh bag. The weight of the wire mesh bag and the sample, typically in the form of thinly sliced foam cuttings, is recorded. Each bag is attached to the corresponding number wire and clips. When the solvent temperature reaches 130° C., the bundle (bag and sample) is immersed in the solvent. The samples are shaken up and down about 5 or 6 times to loosen any air bubbles and fully wet the samples. The samples are attached to an agitator and agitated for three (3) hours so that the solvent can dissolve the foam. The samples are then cooled in a fume hood. The samples are washed by shaking up and down about 7 or 8 times in a container of primary acetone. The samples are washed a second time in a second acetone wash. The washed samples are washed once more in a third container of fresh acetone as above. The samples are then hung in a fume hood to evaporate the acetone for about 1 to about 5 minutes. The samples are then dried in a drying oven for about 1 hour at 120° C. The samples are cooled for a minimum of about 15 minutes. The wire mesh bag is weighed on an analytical balance and the weight is recorded. Crosslinking is then calculated using the formula 100*(C−A)/(B−A), where A=empty wire mesh bag weight; B=wire bag weight+foam sample before immersion in tetralin; and C=wire bag weight+dissolved sample after immersion in tetralin.

It is important to note that polyamide does not dissolve in tetralin. Thus, the gel percentage calculated in the above method includes the crosslinked polyolefin component(s) plus the polyamide component(s).

Suitable crosslinking promoters include, but are not limited to, commercially available difunctional, trifunctional, tetrafunctional, pentafunctional, and higher functionality monomers. Such crosslinking monomers are available in liquid, solid, pellet, and powder forms. Examples include, but are not limited to, acrylates or methacrylates such as 1,6-hexanediol diacrylate, 1,6-hexanediol dimethacrylate, ethylene glycol diacrylate, ethylene glycol dimethacrylate, trimethylol propane trimethacrylate, tetramethylol methane triacrylate, 1,9-nonanediol dimethacrylate and 1,10-decanediol dimethacrylate; allyl esters of carboxylic acid (such as trimellitic acid triallyl ester, pyromellitic acid triallyl ester, and oxalic acid diallyl ester); allyl esters of cyanulic acid or isocyanulic acid such as triallyl cyanurate and triallyl isocyanurate; maleimide compounds such as N-phenyl maleimide and N,N'-m-phenylene bismaleimide; compounds having at least two tribonds such as phthalic acid dipropagyl and maleic acid dipropagyl; and divinylbenzene. Additionally, such crosslinking promoters may be used alone or in any combination. Divinylbenzene (DVB), a difunctional liquid crosslinking monomer, can be used as a crosslinking promoter in the present disclosure. For example, a suitable commercially-available DVB may include DVB HP by Dow.

The amount of crosslinking promoter in a foam layer composition can be less than or equal to about 5 PPR %, about 4 PPR %, about 3 PPR %, about 2.5 PPR %, about 2 PPR %, about 1.5 PPR %, or about 1 PPR % of the composition. In some embodiments, the amount of crosslinking promoter in a foam layer composition can be greater than or equal to about 0.5 PPR %, about 1 PPR %, about 1.5 PPR %, about 2 PPR %, about 2.5 PPR %, about 3 PPR %, or about 4 PPR % of the composition. In some embodiments, the amount of crosslinking promoter in a foam layer composition can be about 0.5-5 PPR %, about 0.5-3 PPR %, about 1-3 PPR %, or about 2-3 PPR % of the composition. In some embodiments, the amount of crosslinking promoter in a foam layer composition can be about 0.5-5 wt. % or about 1-3 wt. % of the foam layer composition.

Note that the above listed amounts of crosslinking promoter can be specific to DVB only. Other crosslinking promoters can be more or less efficient in crosslinking than DVB. Thus, the required quantity for another crosslinking promoter should be considered accordingly. Crosslinking promoters can vary in crosslinking efficiency based on the ionizing radiation dosage, the polymers being crosslinked, the chemical structure of the monomer, the number of functional groups on the monomer, and whether the monomer is a liquid or a powder.

Crosslinks may be generated using a variety of different techniques and can be formed both intermolecularly, between different polymer molecules, and intramolecularly, between portions of a single polymer molecule. Such techniques include, but are not limited to, providing crosslinking promoters which are separate from a polymer chain and providing polymer chains which incorporate a crosslinking promoter containing a functional group which can form a crosslink or be activated to form a crosslink.

After irradiating the coextruded sheet, foaming may be accomplished by heating the crosslinked multilayered sheet to a temperature higher than the decomposition temperature of the thermally decomposable blowing agent. The foaming can be performed at about 200-260° C. or about 220-240° C. in a continuous process. A continuous foaming process can be preferred over a batch process for production of a continuous foam sheet.

The foaming can be typically conducted by heating the crosslinked multilayered sheet with molten salt, radiant heaters, vertical or horizontal hot air oven, microwave energy, or a combination of these methods. The foaming may also be conducted in an impregnation process using, for example, nitrogen in an autoclave, followed by a free foaming via molten salt, radiant heaters, vertical or horizontal hot air oven, microwave energy, or a combination of these methods. Optionally, before foaming, the crosslinked multilayered sheet can be softened with preheating. This can help stabilize the expansion of the structure upon foaming, particularly with thick and stiff sheets.

The overall thickness of the multilayered foam sheet can be measured according to JIS K6767.

The thickness of the cap layer of the multilayered foam sheet can be measured using a microscope. To measure the cap layer, a small sample of the foam structure can be taken from the continuous foamed sheet. The sample can be cut with an extra keen blade and the cross section of the sample viewed along the cut with a microscope. A measurement can be performed with either a digital or traditional microscope. A typical commercial digital microscope can have various software features to facilitate the thickness measurement. A traditional commercial microscope can have a lens with measuring scales to facilitate the thickness measurement.

The density of the multilayered foam sheet can be defined and measured using section or "overall" density, rather than a "core" density, as measured by JIS K6767. The multilayered foam sheets produced using the above described method can yield foams with a section, or "overall" density of about 20-250 kg/m3, about 30-200 kg/m3, or about 50-150 kg/m3. The section density can be controlled by the amount of blowing agent and the thickness of the extruded structure. If the density of the multilayered foam sheet is less than about 20 kg/m3, then the sheet may not foam efficiently due to a large amount of chemical blowing agent needed to attain the density. Additionally, if the density of the sheet is less than about 20 kg/m3, then the expansion of the sheet during the foaming step may become increasingly difficult to control. Furthermore, if the density of the multilayered foam sheet is less than about 20 kg/m3, then the foam may become increasingly prone to cell collapse. Thus, it may be difficult to produce a multilayered foam sheet of uniform section density and thickness at a density less than about 20 kg/m3.

In some embodiments, the multilayered foam sheet may is not limited to a section density of about 250 kg/m3. A foam having a section density of about 350 kg/m3, about 450 kg/m3, or about 550 kg/m3 may also be produced. However, it may be preferred that the foam sheet have a density of less than about 250 kg/m3 since greater densities can be generally cost prohibitive when compared to other materials which can be used in a given application.

The foam layers produced using the above method may have closed cells. Preferably, at least 90% of the cells have undamaged cell walls, preferably at least 95%, and more preferably more than 98%. The average cell size can be from about 0.05 to about 1.0 mm, and preferably from about 0.1 to about 0.7 mm. If the average cell size is lower than about 0.05 mm, then the density of the foam structure can typically be greater than 250 kg/m3. If the average cell size is larger than 1 mm, the foam may have an uneven surface. There is also a possibility of the foam structure being undesirably torn if the population of cells in the foam does not have the preferred average cell size. This can occur when the foam structure is stretched or portions of it are subjected to a secondary process. The cell size in the foam layer(s) may have a bimodal distribution representing a population of cells in the core of the foam structure which are relatively round and a population of cells in the skin near the surfaces of the foam structure which are relatively flat, thin, and/or oblong.

The overall thickness of the multilayered polyolefin foam/polyamide cap sheet can be about 0.2 mm to about 50 mm, about 0.4 mm to about 40 mm, about 0.6 mm to about 30 mm, or about 0.8 mm to about 20 mm. If the thickness is less than about 0.2 mm, then foaming may not be efficient due to significant gas loss from the primary surface(s). If the thickness is greater than about 50 mm, expansion during the foaming step can become increasingly difficult to control. Thus, it can be increasingly more difficult to produce a multilayered polyolefin foam/polyolefin cap sheet with uniform section density and thickness. In some embodiments, a cap layer of the foamed, coextruded multilayer structure can have a thickness of about 0.0001-0.2 mm, about 0.001-0.15 mm, or about 0.05-0.1 mm. In some embodiments, a foam layer of the foamed, coextruded multilayer structure can have a thickness of about 0.5-6 mm, about 1-5 mm, or about 2-4 mm.

In some embodiments, the desired thickness can be obtained by a secondary process such as slicing, skiving, or bonding. Slicing, skiving, or bonding can produce a thickness range of about 0.1 mm to about 100 mm.

The thickness of the cap layer may be reduced upon foaming of the multilayered sheet. This can be due to the foamable layer(s) expanding and consequently stretching the cap layer(s). Thus, for example, if the multilayered sheet expands to twice its original area, the cap thickness can be expected to be about halved. If the multilayered sheet expands to four times its original area, the cap thickness can be expected to be reduced to about one-quarter of its original thickness.

The disclosed multilayer foam structures can be used in a variety of applications. One such application is as an article produced via LPM. In the Summary, a description of the multilayer foam structure as a trim component in a vehicle interior (specifically, a door panel) was provided. However, the multilayer foam structure is not limited to vehicle door panels and can also be used in other vehicle interior parts such as door rolls, door inserts, door stuffers, trunk stuffers, armrests, center consoles, seat cushions, seat backs, headrests, seat back panels, knee bolsters, or a headliner.

Another application is in thermoformed articles. To thermoform the multilayer foam structure, the structure can be heated to the melting point of the polyolefin foam layer and polyamide cap layer. Since most commercially available polyamides have a melting temperature greater than the polyolefin component(s) described in the disclosure, the multilayer foam structure can be heated to the melting point of the polyamide.

One example of a thermoformed article is an automobile air duct. A closed cell foam structure can be particularly suited for this application due to its lower weight (when compared to solid plastic), its insulating properties that help maintain the temperature of the air flowing thru the duct, and its resistance to vibration (versus solid plastic). A polyamide cap layer on the outside of the multilayered air duct can protect the air duct from contact with "under the hood" and vehicle interior liquids and greases that could negatively impact the functionality of the polyolefin foam. The cap layer can also protect the foam layer from punctures and cuts during installation and during the life of the vehicle. Thus, a firm polyolefin foam with polyamide cap can be suitable for an automobile air duct.

In some embodiments, the multilayer foam structures can be laminates containing the multilayer foam and a laminate layer. Preferably, the laminate layer can be applied to a side (i.e., surface) of a foam layer opposite the cap layer. In these laminates, the multilayer foam structure can, for example, be combined with a film and/or foil. Examples of suitable materials for such layers include, but are not limited to, polyvinyl chloride (PVC); thermoplastic polyolefin (TPO); thermoplastic urethane (TPU); fabrics such as polyester, polypropylene, cloth and other fabrics; leather; and/or fiber layers such as non-wovens. Such layers may be manufactured using standard techniques that are well known to those of ordinary skill in the art. Importantly, the multi-layer foam of the disclosure may include multiple other layers.

In these laminates, a layer may be joined to an adjacent layer by means of chemical bonds, mechanical means, or combinations thereof. Adjacent laminate layers may also be affixed to each other by any other means including the use of attractive forces between materials having opposite electromagnetic charges or attractive forces present between materials which both have either a predominantly hydrophobic character or a predominantly hydrophilic character.

To satisfy the requirements of any of the above applications, the disclosed structures of the present disclosure may be subjected to various secondary processes, including and not limited to, embossing, corona or plasma treatment, surface roughening, surface smoothing, perforation or microperforation, splicing, slicing, skiving, layering, bonding, and hole punching.

EXAMPLES

Raw Materials for Examples

The following Table 1 provides a list of components and descriptions of those components used in the following Examples.

TABLE 1

Materials Used to Produce Coextruded, Crosslinked Polyolefin Foam with Polyamide Cap Layers

| Component | Type | Manufacturer | MFI | Description/Notes |
|---|---|---|---|---|
| PA 1212BR-III | PA1212 | Shandong Donchen New Technology | — | commercially produced |
| Grilamid ® L20 | PA12 | EMS-CHEMIE (EMS-GRIVORY) | — | commercially produced |
| Plexar ® PX6006 | MAH-g-PP-PE random copolymer | LyondellBasell | 4.0 (2.16 kg, 230° C.) | commercially produced maleic anhydride grafted polypropylene-polyethylene random copolymer |
| 6232 | PP/PE random copolymer | Total Petrochemicals | 1.3-1.6 (2.16 kg, 230° C.) | commerically produced |
| Infuse ™ OBC 9107 | OBC (PE/acetone copolymer based) | Dow | 0.75-1.25 (2.16 kg, 190° C.) | commerically produced olefin block copolymer |
| Adflex ® Q100F | rTPO (PP/PE random copolymer based) | LyondellBasell | 0.5-0.7 (2.16 kg, 230° C.) | commerically produced reactor thermoplastic polyolefin |
| Unifoam ® TC-18I | chemical foaming agent (ADCA) | P.T. Lauten Otsuka Chemical | — | commerically produced azodicarbonamide |
| DVB HP | crosslinking promoter | Dow | — | commerically poduced, 80% DVB content |
| "PR086" | anti-oxidant package | Amfine Chemical | — | A Toray Plastics (America) standard antioxidant package consisting of 100% antioxidant powder |
| "PR023" | anti-oxidant package (LDPE carrier) | Techmer PM | — | A Toray Plastics (America) standard antioxidant package for polyolefin foam, compounded by Techmer PM, consisting of 14% antioxidants, 0.35% calcium stearate, and 85.65% low density polyethylene (LDPE) carrier resin |
| TPM11166 | processing aid (LLDPE/butene copolymer carrier) | Techmer PM | — | commerically produced extrusion processing aid blend |
| 9040 | black concentrate (PE/methyl acrylate copolymer carrier) | Modern Dispersions | — | commercially produced color concentrate. 40% carbon black loading, 19 Nm typical carbon black particle size |

Conversion Process for Examples

The following Table 2 provides formulation and coextrusion information for Examples 1 and 2. All Examples were foamed by heating the multilayered sheet with molten salt.

TABLE 2

Coextruded, Crosslinked Polyolefin Foam with Polyamide Cap Layers-Examples

| | | FORMULATIONS | | | | | | | |
|---|---|---|---|---|---|---|---|---|---|
| | | resins (PPR % & overall %) | | | | | | additives | |
| | | | | | | | | (PPR % & overall %) | |
| example ID | layer ID | PA1212 PA 1212BR-III | PA12 Grilamid ® L20 | MAG-g-PP PE random copolymer Plexar ® PX6006 | PP/PE random copolymer 6232 | OBC (PE/octene copolymer based) infuse ™ 9107 | rTPO (PE/PE random copolymer based) Adflex ® 01005 | chemical foaming agent (ADCA) Unifoam ® TC-18I | x-linking promoter DVB HP | anti-oxidant package "PR086" |
| Example 1 | "B" cap layer | 75% 72.82% | | 25% 24.27% | | | | | | 1.0% 0.97% |
| | "A" layer (foamed) | | | 25% 21.46% | 25% 21.46% | 40% 34.33% | 10% 8.58% | 6.50% 5.58% | 2.50% 2.15% | 1.0% |
| Example 2 | "B" cap layer | | 75% 72.82% | 25% 24.27% | | | | | | 0.97% |
| | "A" layer (foamed) | | | 25% 21.46% | 25% 21.46% | 40% 34.33% | 10% 8.58% | 6.50% 5.58% | 2.50% 2.15% | |

TABLE 2-continued

Coextruded, Crosslinked Polyolefin Foam with Polyamide Cap Layers-Examples

| | | FORMULATIONS additives (PPR % & overall %) | | | COEXTRUSION | | | | | |
|---|---|---|---|---|---|---|---|---|---|---|
| example ID | layer ID | anti-oxidant package (LDPE carrier) "PR023" | processing aid (LLDPE/ butene copolymer carrier) TPM11166 | black concentrate (PE/methyl acrylate copolymer carrier) 9040 | type | extruder | specific energy of extrusion (kW hr/kg) | melt temp (° C.) | unfoamed overall sheet thickness (mm) | unfoamed cap thickness (mm) |
| Example 1 | "B" cap layer | | | 2.0% 1.9% | 80/20 feed block manifold | co-rotating twin screw | 0.25 | 199 | 1.57-1.70 | 0.23-0.30 |
| | "A" layer (foamed) | 5.5% 4.72% | 2% 1.72% | | | co-rotating twin screw | 0.17 | not recorded* | | — |
| Example 2 | "B" cap layer | | | 2.0% 1.9% | 80/20 feed block manifold | co-rotating twin screw | 0.30 | 185 | 1.41-1.49 | 0.21-0.24 |
| | "A" layer (foamed) | 5.5% 4.72% | 2% 1.72% | | | co-rotating twin screw | 0.19 | not recorded* | | — |

*melt probe thermocouple not functioning

The following Table 3 provides irradiation and properties of the multilayer structure of Examples 1 and 2. Sections of the unfoamed sheet of Example 1 was irradiated under three separate dosages and further identified as Examples 1A-1C. Sections of the unfoamed sheet of Example 2 was irradiated under seven separate dosages and further identified as Examples 2A-2G.

TABLE 3

Coextruded, Crosslinked Polyolefin Foam with Polyamide Cap Layers-Examples

| | | IRRADIATION | | | FOAMING | | | | IMAGES |
|---|---|---|---|---|---|---|---|---|---|
| example ID | layer ID | which layer facing radiation source? | dosage (kGy) | voltage (kV) | foaming temp. (° C.) | thickness (cap = mm, foam = mm) | overall density (kg/m$^3$) | overall gel (%) | unfoamed and foamed photos included? |
| Example 1A | "B" cap layer | | | 750 | | 0.07 | | | |
| | "A" layer (foamed) | facing radiation | 45 | | 236 | 2.8 | 101 | 45 | |
| Example 1B | "B" cap layer | | | 750 | | 0.08 | | | |
| | "A" layer (foamed) | facing radiation | 60 | | 236 | 2.7 | 97 | 54 | yes |
| Example 1C | "B" cap layer | | | 750 | | 0.06 | | | |
| | "A" layer (foamed) | facing radiation | 75 | | 236 | 3.1 | 91 | 58 | |
| Example 2A | "B" cap layer | | | 750 | 234 | 0.05 | | | |
| | "A" layer (foamed) | facing radiation | 30 | | | 2.6 | 83 | 22 | yes |
| Example 2B | "B" cap layer | | | 750 | 234 | 0.04 | | | |
| | "A" layer (foamed) | facing radiation | 45 | | | 2.7 | 74 | 32 | |
| Example 2C | "B" cap layer | | | 750 | 234 | 0.04 | | | |
| | "A" layer (foamed) | facing radiation | 60 | | | 3.0 | 66 | 42 | |
| Example 2D | "B" cap layer | | | 750 | 234 | 0.04 | | | |
| | "A" layer (foamed) | facing radiation | 75 | | | 3.2 | 62 | 48 | yes |
| Example 2E | "B" cap layer | | | 750 | 234 | 0.03 | | | |
| | "A" layer (foamed) | facing radiation | 90 | | | 3.1 | 66 | 55 | |
| Example 2F | "B" cap layer | | | 750 | 234 | 0.03 | | | |
| | "A" layer (foamed) | facing radiation | 105 | | | 3.3 | 64 | 58 | |
| Example 2G | "B" cap layer | | | 750 | 234 | 0.03 | | | |
| | "A" layer (foamed) | facing radiation | 120 | | | 3.2 | 71 | 61 | yes |

Figure 2:
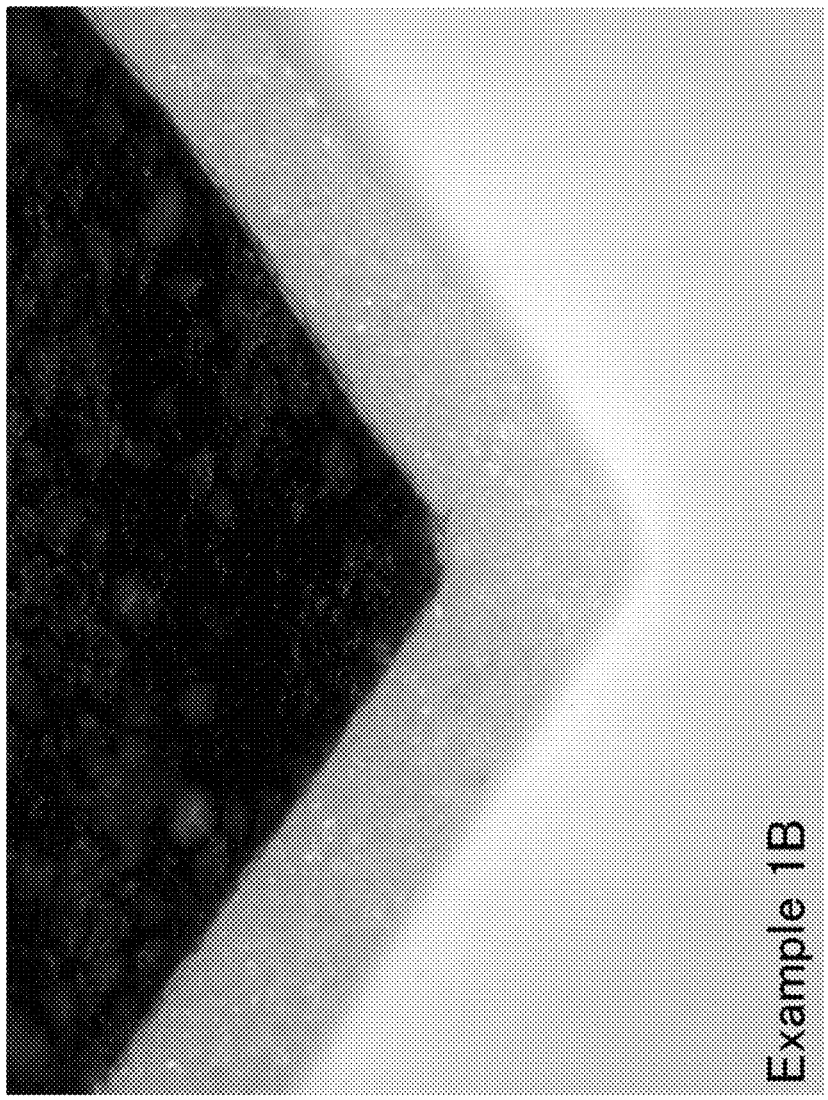
FIG. 2 is an image of Example 1B foamed at 20× magnification and 45° from the cap surface.
Figure 3:
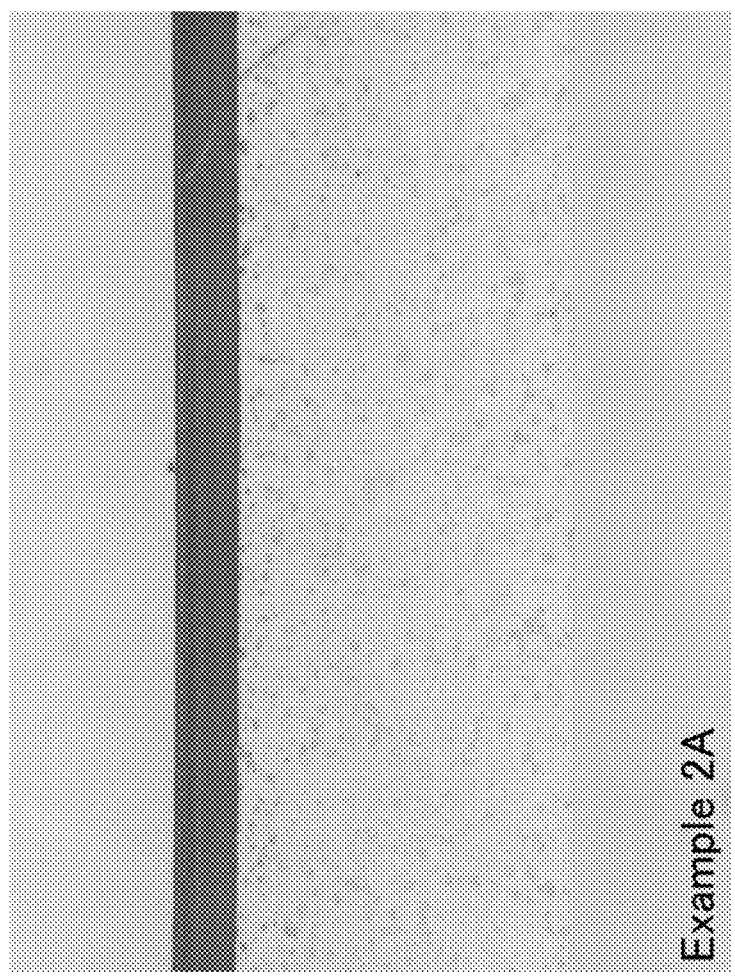
FIG. 3 is a cross-sectional image of a microtome slice of Example 2A unfoamed at 100× magnification.
Figure 4:
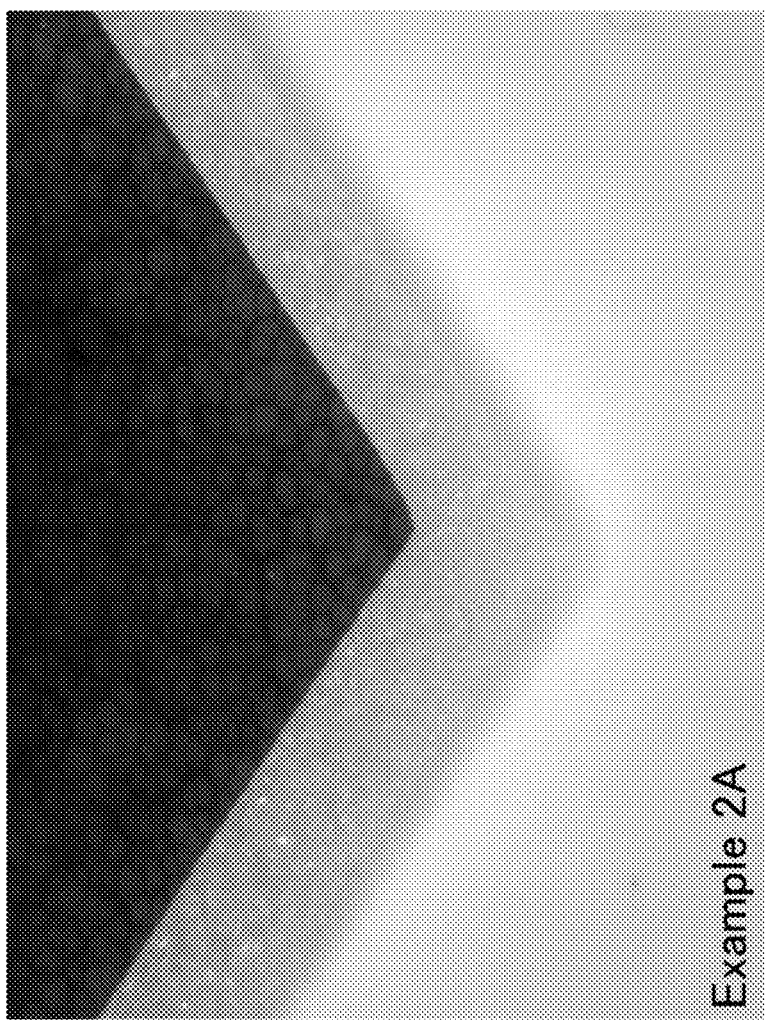
FIG. 4 is an image of Example 2A foamed at 20× magnification and 45° from the cap surface.
Figure 5:
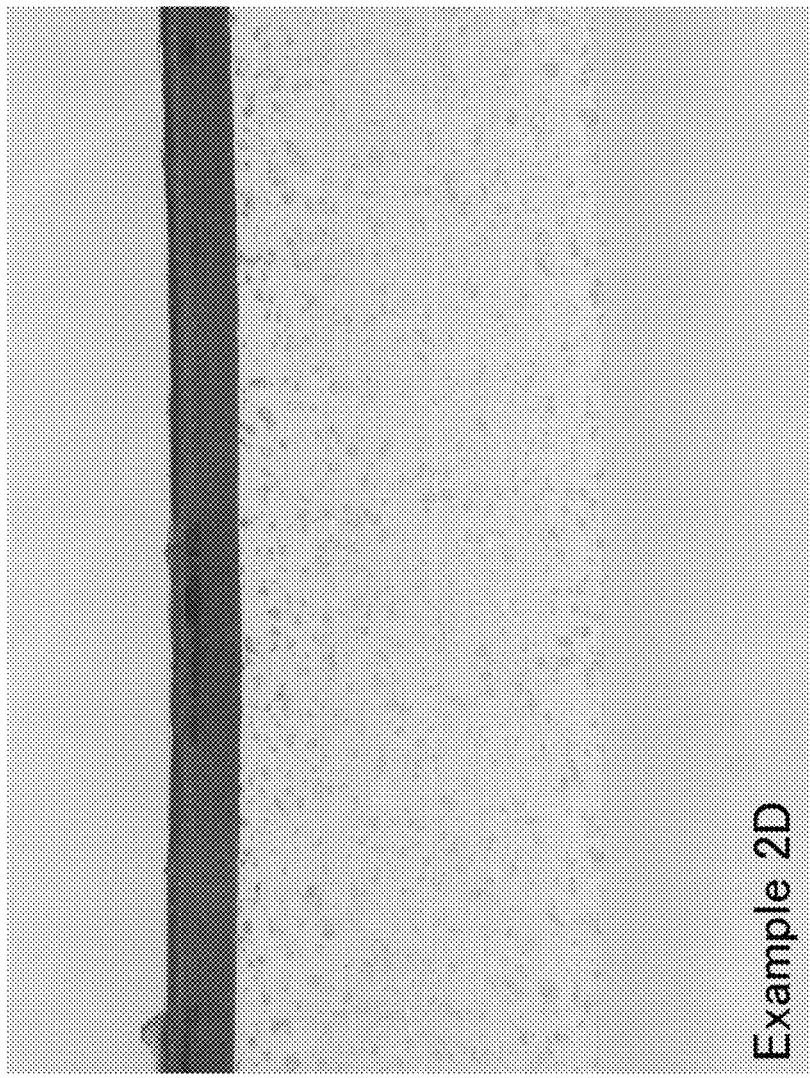
FIG. 5 is a cross-sectional image of a microtome slice of Example 2D unfoamed at 100× magnification.
Figure 6:
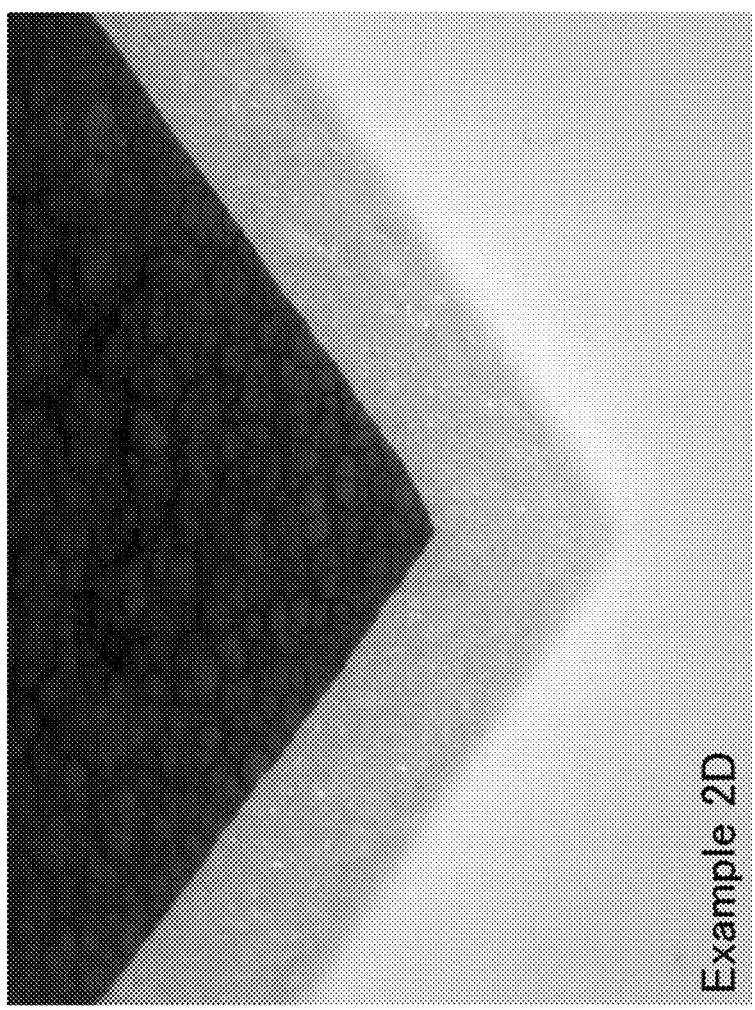
FIG. 6 is an image of Example 2D foamed at 20× magnification and 45° from the cap surface.
Figure 7:
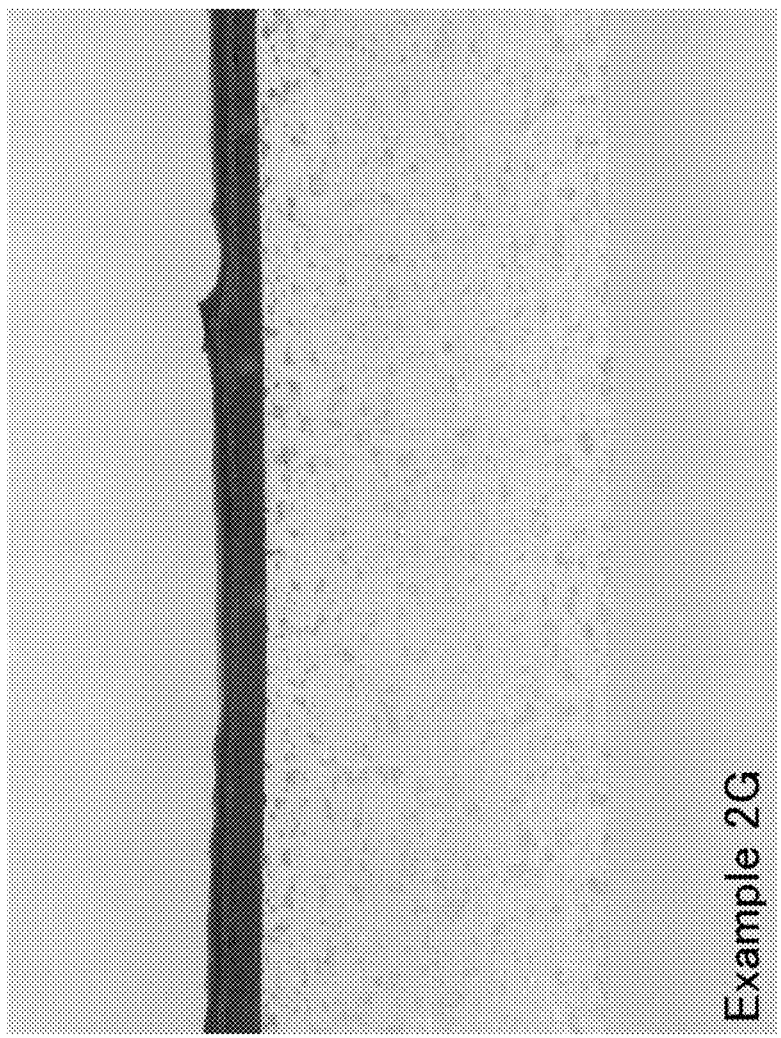
FIG. 7 is a cross-sectional image of a microtome slice of Example 2G unfoamed at 100× magnification.
Figure 8:
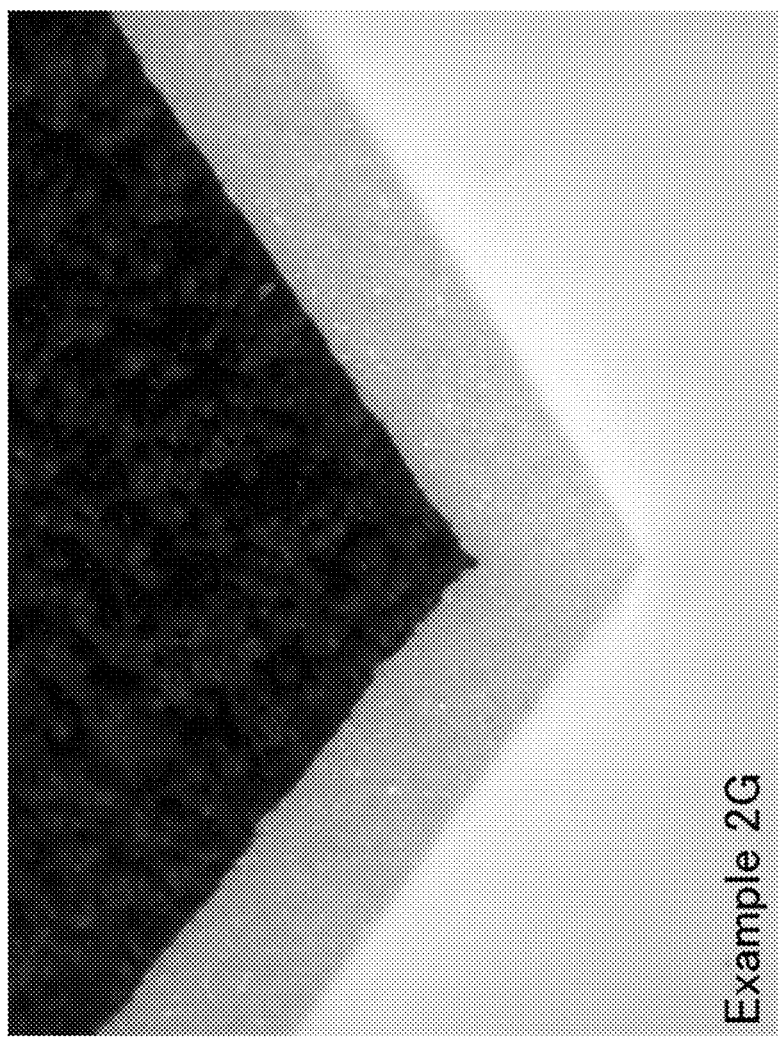
FIG. 8 is an image of Example 2G foamed at 20× magnification and 45° from the cap surface.

Cross-sectional images of microtome slices of the unfoamed multilayered structures of Examples 1B, 2A, 2D, and 2G at 100× magnification can be found in FIGS. 1, 3, 5, and 7. Images of the corresponding foamed Examples 1B, 2A, 2D, and 2G at 20× magnification can be found in FIGS. 2, 4, 6, and 8.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A multilayer foam structure comprising:
   a foam layer comprising:
     polypropylene, polyethylene, or a combination of polypropylene and polyethylene; and
   a cap layer on a side of the foam layer, the cap layer consisting of:
     1-10 wt. % additives;
     at least 40 wt. % polyamide, and
     at most 50 wt. % polypropylene, polyethylene, or a combination of polypropylene and polyethylene.

2. The multilayer foam structure of claim 1, wherein the foam layer and the cap layer are coextruded.

3. The multilayer foam structure of claim 1, wherein the foam layer comprises at least 70 wt. % of the polypropylene, the polyethylene, or the combination of polypropylene and polyethylene.

4. The multilayer foam structure of claim 1, wherein a thickness of the cap layer is less than 1 mm.

5. The multilayer foam structure of claim 1, wherein the foam layer further comprises a crosslinking promoter in an amount of 0.5-5.0 wt. %.

6. The multilayer foam structure of claim 1, wherein the foam layer further comprises additives in an amount of 1-20 wt. %.

7. The multilayer foam structure of claim 1, wherein any polypropylene of the multilayer foam structure has a melt flow index of 0.1-25 grams per 10 minutes at 230° C.

8. The multilayer foam structure of claim 1, wherein any polyethylene of the multilayer foam structure has a melt flow index of 0.1-25 grams per 10 minutes at 190° C.

9. The multilayer foam structure of claim 1, wherein the density of the multilayer foam structure is 20-250 kg/m³.

10. The multilayer foam structure of claim 1, wherein the multilayer foam structure has a crosslinking degree of 20-75%.

11. The multilayer foam structure of claim 1, wherein the multilayer foam structure has an average closed cell size of 0.05-1.0 mm.

12. The multilayer foam structure of claim 1, wherein the multilayer foam structure has a thickness of 0.2-50 mm.

13. The multilayer foam structure of claim 1, wherein the additives are at least one selected from the group consisting of organic peroxides, antioxidants, lubricants, processing aids, thermal stabilizers, colorants, flame retardants, antistatic agents, nucleating agents, plasticizers, antimicrobials, fungicides, light stabilizers, UV absorbents, anti-blocking agents, deodorizers, odor adsorbers, anti-fogging agents, volatile organic compound (VOC) adsorbers, semi-volatile organic compound (SVOC) adsorbers, thickeners, cell size stabilizers, and metal deactivators.

14. A laminate comprising:
    a multilayer foam structure comprising:
      a foam layer comprising polypropylene, polyethylene, or a combination of polypropylene and polyethylene;
      a cap layer on a side of the foam layer, the cap layer consisting of:
      1-10 wt. % additives;
      at least 40 wt. % polyamide, and
      at most 50 wt. % polypropylene, polyethylene, or a combination of polypropylene and polyethylene; and
    a laminate layer on a side of the foam layer opposite the cap layer.

15. The laminate of claim 14, wherein the foam layer and the cap layer are coextruded.

16. The laminate of claim 14, wherein the laminate layer is a flexible film, fabric, or foil.

17. The laminate of claim 14, wherein the laminate layer is foamed.

18. The laminate of claim 14, wherein the cap layer is unfoamed.

19. The laminate of claim 14, wherein the foam layer comprises at least 70 wt. % of the polypropylene, the polyethylene, or the combination of polypropylene and polyethylene.

20. The laminate of claim 14, wherein a thickness of the cap layer is less than 1 mm.

21. The laminate of claim 14, wherein the foam layer further comprises additives in an amount of 1-20 wt. %.

22. The laminate of claim 14, wherein any polypropylene of the multilayer foam structure has a melt flow index of 0.1-25 grams per 10 minutes at 230° C.

23. The laminate of claim 14, wherein any polyethylene of the multilayer foam structure has a melt flow index of 0.1-25 grams per 10 minutes at 190° C.

24. The laminate of claim 14, wherein the density of the multilayer foam structure is 20-250 kg/m³.

25. The laminate of claim 14, wherein the multilayer foam structure has a crosslinking degree of 20-75%.

26. The laminate of claim 14, wherein the multilayer foam structure has an average closed cell size of 0.05-1.0 mm.

27. The laminate of claim 14, wherein the multilayer foam structure has a thickness of 0.2-50 mm.

28. The laminate of claim 14, wherein the additives are at least one selected from the group consisting of organic peroxides, antioxidants, lubricants, processing aids, thermal stabilizers, colorants, flame retardants, antistatic agents, nucleating agents, plasticizers, antimicrobials, fungicides, light stabilizers, UV absorbents, anti-blocking agents, deodorizers, odor adsorbers, anti-fogging agents, volatile organic compound (VOC) adsorbers, semi-volatile organic compound (SVOC) adsorbers, thickeners, cell size stabilizers, and metal deactivators.

* * * * *